US007971086B2

(12) United States Patent
Itkin

(10) Patent No.: US 7,971,086 B2
(45) Date of Patent: Jun. 28, 2011

(54) INTEGRATED WAKING/WHILE-AWAKE POWER MANAGEMENT SYSTEM WITH BREAKING DISTANCE TIMER FOR HIGH WAKE-UP LATENCY PORTION OF HARDWARE

(75) Inventor: Yuval Itkin, Zoran (IL)

(73) Assignee: D. S. P. Group Ltd., Herzliya (IL)

( * ) Notice: Subject to any disclaimer, the term of this patent is extended or adjusted under 35 U.S.C. 154(b) by 1178 days.

(21) Appl. No.: 11/702,655

(22) Filed: Feb. 6, 2007

(65) Prior Publication Data

US 2008/0189563 A1   Aug. 7, 2008

(51) Int. Cl.
*G06F 1/26* (2006.01)
(52) U.S. Cl. .................................. 713/330; 327/530
(58) Field of Classification Search .............. 713/300, 713/330; 327/530
See application file for complete search history.

(56) References Cited

U.S. PATENT DOCUMENTS

| | | | |
|---|---|---|---|
| 6,785,829 B1 | 8/2004 | George et al. | |
| 7,565,560 B2 * | 7/2009 | Boecker et al. ............... | 713/320 |
| 7,759,917 B2 * | 7/2010 | Ishino ........................... | 323/268 |
| 2002/0041178 A1 | 4/2002 | Hiraki et al. | |
| 2002/0167827 A1 | 11/2002 | Umeda et al. | |
| 2004/0019815 A1 | 1/2004 | Vyssotski et al. | |
| 2004/0105198 A1 | 6/2004 | Fujii | |
| 2005/0182976 A1 | 8/2005 | Berkes et al. | |
| 2006/0294403 A1 | 12/2006 | Bennett | |

FOREIGN PATENT DOCUMENTS

| | | |
|---|---|---|
| EP | 1 617 315 A1 | 1/2006 |
| WO | 98/19223 | 5/1998 |
| WO | 02082248 A2 | 10/2002 |

OTHER PUBLICATIONS

Adaptive Power Management for Mobile Hard Drives; Adaptive Battery Life Extender; A Self-Managed Approach to Saving Energy; http://www.almaden.ibm.com/almaden/mobil_hard_drives.htm; IBM Research; Jan. 1999; pp. 1-11.
BROADCOM Corporation; BCM59001 Mobile Power Management Unit; http://www.broadcom.com/products/Cellular/Power-Management-Solutions/BCM59001; 2007.

* cited by examiner

*Primary Examiner* — Albert Wang
(74) *Attorney, Agent, or Firm* — Browdy and Neimark, PLLC

(57) ABSTRACT

A system for activating and deactivating a hardware device including a first stage electronic deactivation unit operative, responsive to a deactivation request, to perform a first deactivation operation including deactivation of a first portion of the hardware device having low wake-up latency at a first time, a second stage electronic deactivation unit including a breaking distance timer activated subsequently to the deactivation request and operative to deactivate a second portion of the hardware device having high wake-up latency at a subsequent second time separated from the first time, and a power management system including a power source and a power supply regulator operative to control the supply of power in accordance with a selectable one of a plurality of regulator settings, selected using a hardware setting selector. Responsive to a wakeup event, the first portion of the hardware device is reactivated and the breaking distance timer is deactivated.

19 Claims, 14 Drawing Sheets

| Mode | CPU clock | Bus clock | HW state | XTALON | USED FOR | PWR_HILO |
|---|---|---|---|---|---|---|
| Stop | Off | Off | Off or Idle | Off | Wait for timed service period or No timed service is active | LO |
| Doze | Slow clock | Slow clock | Off or Idle | Off | Low frequency keep-alive | LO |
| CPU Doze | Off | Slow clock | Off or Idle or Active | On | No MIPS required, HW alive | LO |
| Very Slow | Fast Reference | Fast Reference | Off or Idle or Active | On | Very Low MIPS activity | HI |
| Slow | Fast clock | Fast clock | Off or Idle or Active | On | Low MIPS activity | HI |
| Fast | 2 x Fast clock | Fast clock | Off or Idle or Active | On | High MIPS activity | HI |

FIG. 7

| Mode | USED FOR |
|---|---|
| Off | Main service state No service state |
| Idle | Main service state Only HW STANDBY timer active Wait period between timed services |
| Active | HW block logic active Active service traffic |

FIG. 8
(PRIOR ART)

| PWR_HILO pin value | PMU mode Definition |
|---|---|
| 0 | Low power mode is active |
| 1 | High power mode is active (or is about to become active) |

FIG. 10

INTEGRATED WAKING/WHILE-AWAKE POWER MANAGEMENT SYSTEM WITH BREAKING DISTANCE TIMER FOR HIGH WAKE-UP LATENCY PORTION OF HARDWARE

FIELD OF THE INVENTION

The present invention relates generally to power management and specifically to power management of battery-powered devices.

BACKGROUND OF THE INVENTION

Hard disk drives for portable applications are described at http://www.almaden.ibm.com/almaden/mobile_hard_drives.html.

An example of state-of-the-art power management for battery-operated systems is described in http://www.broadcom.com/products/Cellular/Power-Management-Solutions/BCM59001).

The disclosures of any publications and patent documents mentioned in the specification, and of the publications and patent documents cited therein directly or indirectly, are hereby incorporated by reference.

SUMMARY OF THE INVENTION

The present invention seeks to provide improved power management for battery operated systems.

Many systems require an optimized power management scheme. Battery operated systems are the most sensitive to power management optimization. Currently, several techniques for low power management are used including clock gating (in CMOS circuits), power level gating, and variable operating voltage and on/off control of modules or sub-modules.

Conventional battery-operated systems treat power management while awake, and management of the wake-up procedure, as separate issues. Power management devices are SW controlled, clock switches are SW controlled, and wakeup from low-power is hardware controlled (usually interrupt based) and is not linked to the power management. When a conventional battery-operated system wakes-up from low-power mode it typically follows the following steps:
 (a) Change power supply mode from low to high;
 (b) Turn on high frequency clock oscillator;
 (c) Wait for regulators and oscillator to stabilize; and
 (d) Switch to high clock and high power operating mode.

All of these operations takes place at low clock, since the waking up system is in its low-power mode, and therefore, the system wake-up latency is extended, and the wake-up lasts longer and consumes more power than is actually required.

A preferred embodiment of the invention shown and described herein integrates the power management of a battery operated system, thereby to conserve power and/or to shorten system latency.

There is thus provided, in accordance with a preferred embodiment of the present invention, an integrated waking/while-awake power management system operative to wake up a battery-operated hardware device, and to provide integrated power management for the battery-operated hardware device once it is awake. The system of the present invention typically serves any generic hardware device comprising one or more processor (CPU) cores and a plural set of real-time modules which may be analog or digital. Each one of the modules may require at different times high power for its operation at certain times, whereas at other times it may remain in low power mode. In many cases, clocks gating allows for dynamic power reduction but may not be sufficient. In other systems, turning off clock source may result in longer wake-up latency and possible higher power consumption. According to a preferred embodiment of the present invention, a single power controller combines requests from all requesters, and dynamically optimizes system power through the use of one or more of the following: gating of system clocks, dynamic clock source change, dynamic power level tuning, programmed sequencing of power so as to achieve minimal power consumption and/or minimal wakeup latency together, system clock source power control, system power control, power management mode control, and configurable parameters to address statistical knowledge for further power optimization. The statistics gathered may serve to define the duration of the breaking-distance timer period. The period is typically application specific and is derived from HW activity profile as well as SW real-time demands.

The integrated waking/while-awake power management system of the present invention preferably provides one, some or all of the following four features as described in detail herein:

1. The requestors do not have to synchronize their request lines, nor to inform other system elements about their current real time demands.

2. Once the system is placed into low power mode, the clock-tree is gated-off, however, a high-speed clock source typically continues to operate for an additional (typically programmable) period. The additional period (breaking distance) allows other system requestors to re-activate the system without additional delay. This preferred feature saves the power which is consumed when the system wakes-up from low power mode (oscillator wakeup time+PLL lock time+ clocks switch time) leading to additional power saving. The duration programmed into this timer is derived from the applications' statistical information such as the average wake-up request time delay following an entry to low-power state.

3. Real-time information of the system activity mode is shared with the power management unit (regulators operating mode and output voltages). This real-time information, e.g. comprising the PWR-HILO signal described herein, further enhances the power efficiency through immediate switch from high-power DCDC converter mode (which may require some switching current) into very low power linear regulators.

4. Conversely, tightly coupled energy-management allows for zero overhead due to power management mode change. This enables the system to change the regulators' operating mode from low-power linear mode into high-power DCDC conversion mode while the system wakes-up and while the crystal oscillator stabilizes.

A PMU is preferably provided which has several modes of control and which typically has a structure comprising a register array and a multiplexer, with hardware signal control on the multiplexer, as described herein.

PWR_HILO and XTALON signals are preferably provided which are real time hardware controlled signals.

A CMU is preferably provided which is at least partly hardware controlled rather than being SW-only controlled.

A power controller state machine and associated XTALOK timer are preferably provided; a DBGEN signal is preferably provided to allow the low-power entry of the Power Controller state-machine to be avoided.

The system of the present invention preferably accommodates a Host processor which, via a Host Interface block shown and described herein, may activate some or all of the system's clocks without requiring any CPU intervention.

The system of the present invention preferably empowers a System Block Module, such as a wireless link interface module, to activate some or all of the system's clocks according to timing of an application-specific service, such as a wireless link, without previously waking up the CPU.

BRIEF DESCRIPTION OF THE DRAWINGS

Preferred embodiments of the present invention are illustrated in the following drawings:

FIG. 7 is a table describing characteristics of several operating modes for the CPU and CPU-BUS clocks, and PWR_HILO states corresponding thereto, all in accordance with a preferred embodiment of the present invention;

FIG. 8 is a table describing characteristics of several operating modes for the main device 35 of FIG. 1, as a function of the main service state provided in accordance with a preferred embodiment of the present invention;

FIG. 10 is a table of pin values for the PW_HILO pin of the system of FIGS. 1A-1B in accordance with certain embodiments of the present invention;

DETAILED DESCRIPTION OF THE DRAWINGS

Figure 1A:
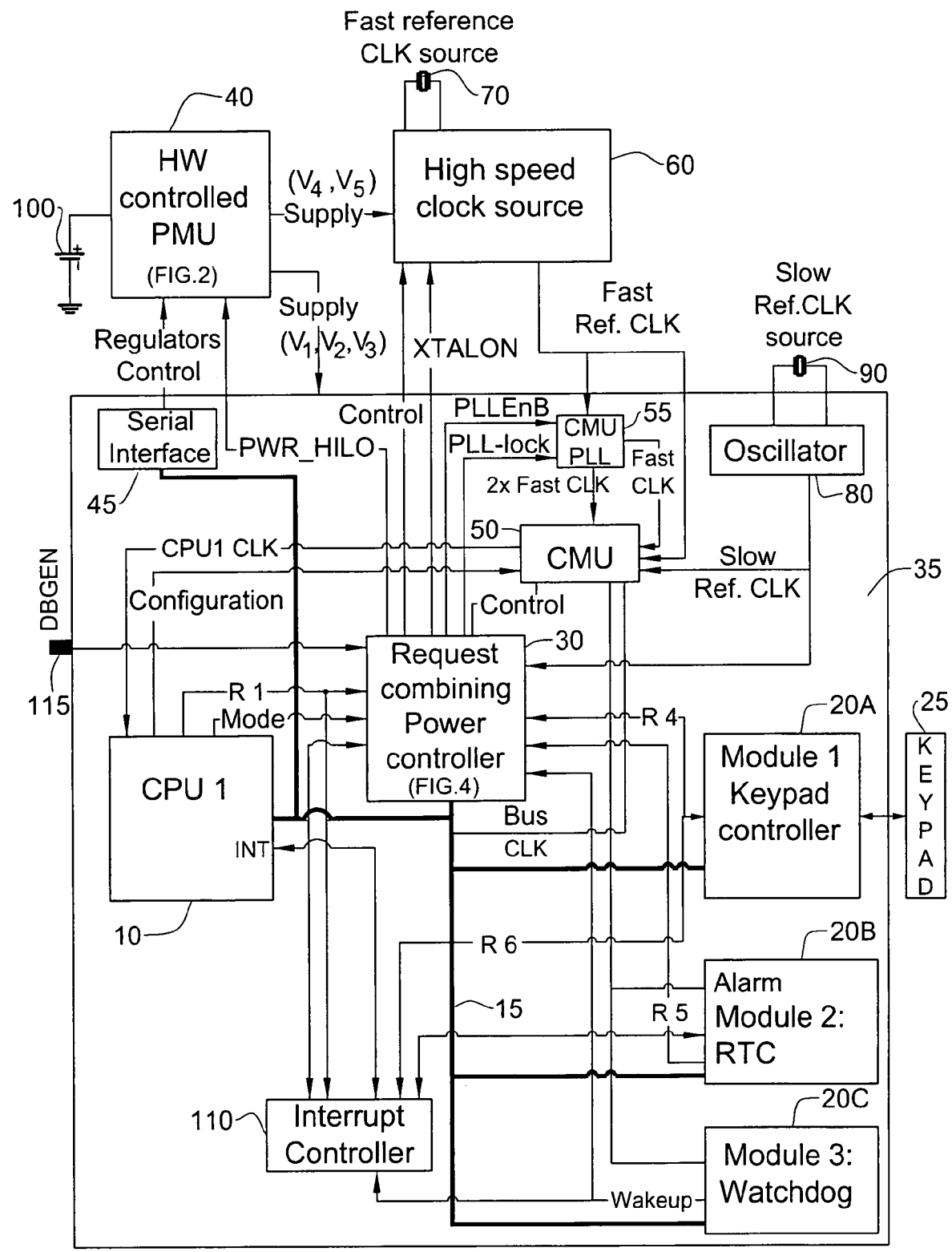
FIG. 1A is a simplified block diagram illustration of an integrated waking/while-awake power management system operative to wake up a battery-operated hardware device including a first set of hardware modules, and to provide integrated power management for the battery-operated hardware device once it is awake, all in accordance with certain embodiments of the present invention.
Figure 1B:
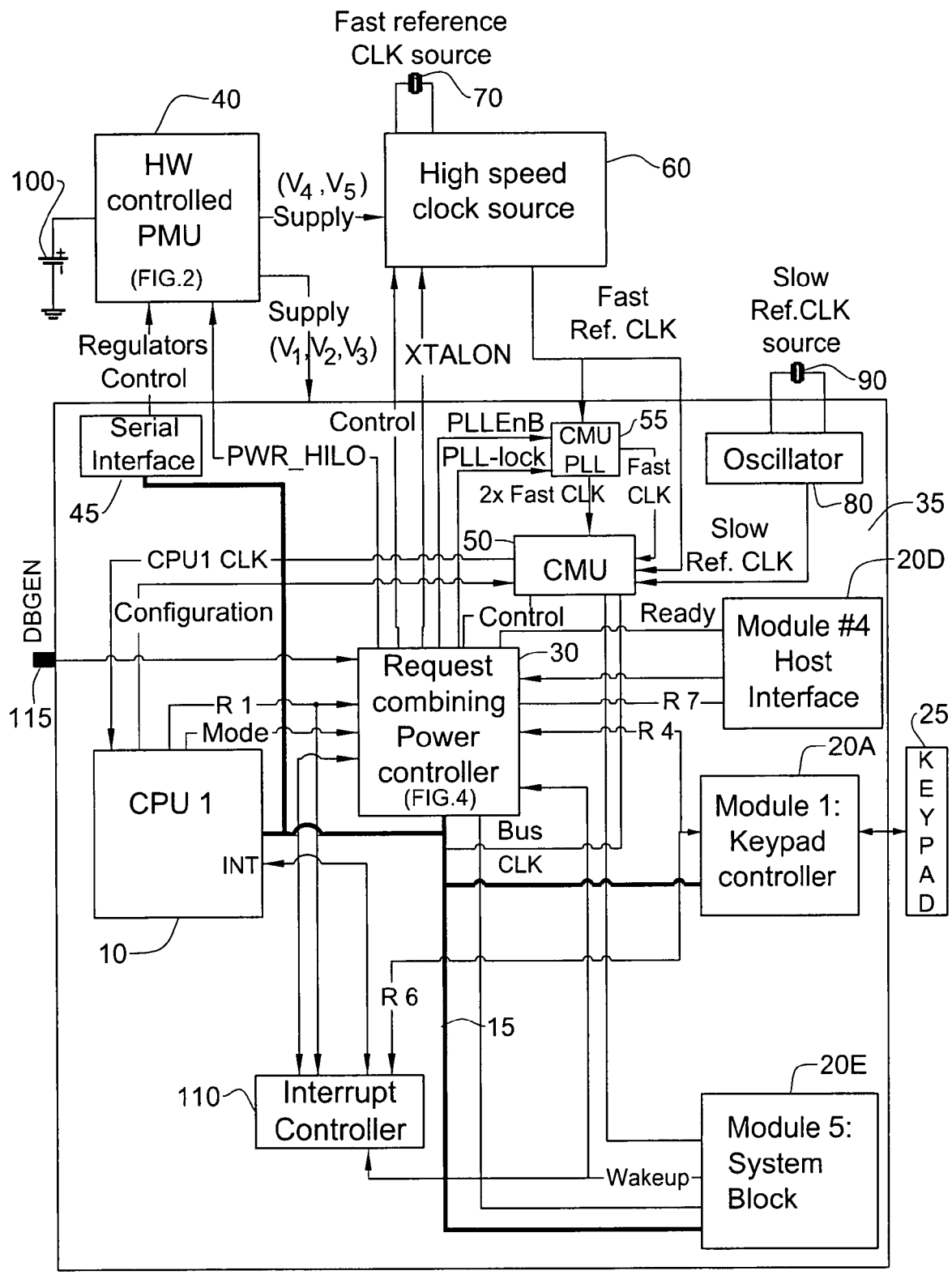
FIG. 1B is a simplified block diagram illustration of an integrated waking/while-awake power management system operative to wake up a battery-operated hardware device including a second set of hardware modules, and to provide integrated power management for the battery-operated hardware device once it is awake, all in accordance with certain embodiments of the present invention.

Reference is now made to FIGS. 1A-1B which are simplified block diagram illustrations of alternative embodiments of an integrated waking/while-awake power management system operative to wake up a battery-operated hardware device, and to provide integrated power management for the battery-operated hardware device once it is awake. As shown, the battery-operated hardware device comprises one or more processor (CPU) cores 10 of which, for simplicity, only one is shown; and one or more real-time modules 20A, 20B, . . . which may be analog or digital. The CPU/s and/or module/s are also termed herein "requestors" or "request sources". The embodiments of FIGS. 1A and 1B differ only in the modules provided. In FIG. 1A, the hardware device includes, by way of example, a keypad controller module 20A associated with a keypad 25, an RTC module 20B and a watchdog module 20C. In FIG. 1B, the hardware device includes keypad controller module 20A, a host interface module 20D and a system block module 20E.

It is appreciated that the particular modules shown in FIGS. 1A-1B are merely by way of example; the system of the present invention being operative to provide integrated waking/while-awake control for hardware devices including any number of modules of any type. Also, the systems of FIGS. 1A and 1B are each shown residing on three hardware devices including a main device 35, and PMU 40 and clock source 60 as separate devices; however it is appreciated that this need not be the case; for example, the first and third devices, or the second and third devices, may be combined into a single device, or any other arrangement of the functional units of FIGS. 1A-1B may be employed.

Each of the typically multiple CPU cores and modules has its own real-time clock/power demands. According to a preferred embodiment of the present invention, all requests, from all CPUs and modules, are sent to a common power controller 30 which responsively automatically gates on/off the system clock sources and power levels as described in detail herein with reference to FIG. 9.

Preferably, the system of the present invention includes a programmable hardware power controller and is operative to save power by optimizing sequencing of Power control of the PMU, PLL and fast reference oscillator.

The system of the present invention typically comprises the following main functional units as shown: a Power management unit (PMU) 40; a Clock management unit (CMU) 50 associated with a CMU PLL 55; and the Power Controller unit 30. These are described below in detail with reference to FIGS. 2, 3 and 4 respectively. The PMU 40 typically has several modes of control and typically comprises a register array and a multiplexer, with hardware signal control on the multiplexer, as described herein with reference to FIG. 2. The CMU 50 is preferably at least partly hardware controlled rather than being SW-only controlled. The system also includes a high speed clock source 60 associated with a fast reference clock source 70 which is controlled by power controller 30 and provides a fast reference clock signal to CMU 50. An oscillator 80 associated with a slow reference clock source 90 provides a slow reference clock signal to the power controller 30. The PMU 40 is powered by a power source 100. An interrupt controller 110 provides interrupt signals to the CPUs 10 in accordance with interrupt-request signals and wakeup signals generated by modules 20A, 20B, . . . .

It is appreciated that in conventional systems, the power management unit and clock management unit are SW-managed, causing the following drawbacks:

(a) A CPU must be active in order to change the system operating modes, thus consuming power, and responding slowly if running from a slow clock source (b) System power is not optimized as more elements than are really required are needed to remain active (c) Longer response times require more power from the battery.

(d) A constant algorithm with no adaptation sometimes requires more power than do adaptive algorithms. According to a preferred embodiment of the present invention, programmable wakeup and break distance durations are provided and the identity of the element allowed to activate the system from standby may be defined through the enable/disable of its interrupt request during low-power mode. Thus, although a hardware controller may be provided, it is programmable hence fully flexible, along with having energy-saving independent operability according to previously programmed parameters.

According to a preferred embodiment of the present invention, a software functionality is provided in at least one of the CPUs 10 which is operative to selectably disable activation of the breaking distance timer 420 of the PMU 40, thereby to provide continued activity of the hardware device's clock source 60 and PMU 40 at any time. The SW functionality allows the CPU 10 to control the operation of the CMU 50 by not allowing the CMU 50 to turn off the clocks and/or power and to disable the breaking-distance timer 40. The SW functionality may selectably disable the hardware device's capacity to gate off clocks, thereby to provide activity of the hardware device's clock source and PMU at any selectable time since these are active by default. This is typically implemented by the mode bit exiting CPU 10 of FIGS. 1A-1B which determines whether automatic power-save is used or not.

In FIGS. 1A-1B, "ref" is used to abbreviate "reference", "clk" is used to abbreviate "clock", and R1, R2, etc. are used to indicate request signals.

Figure 2:
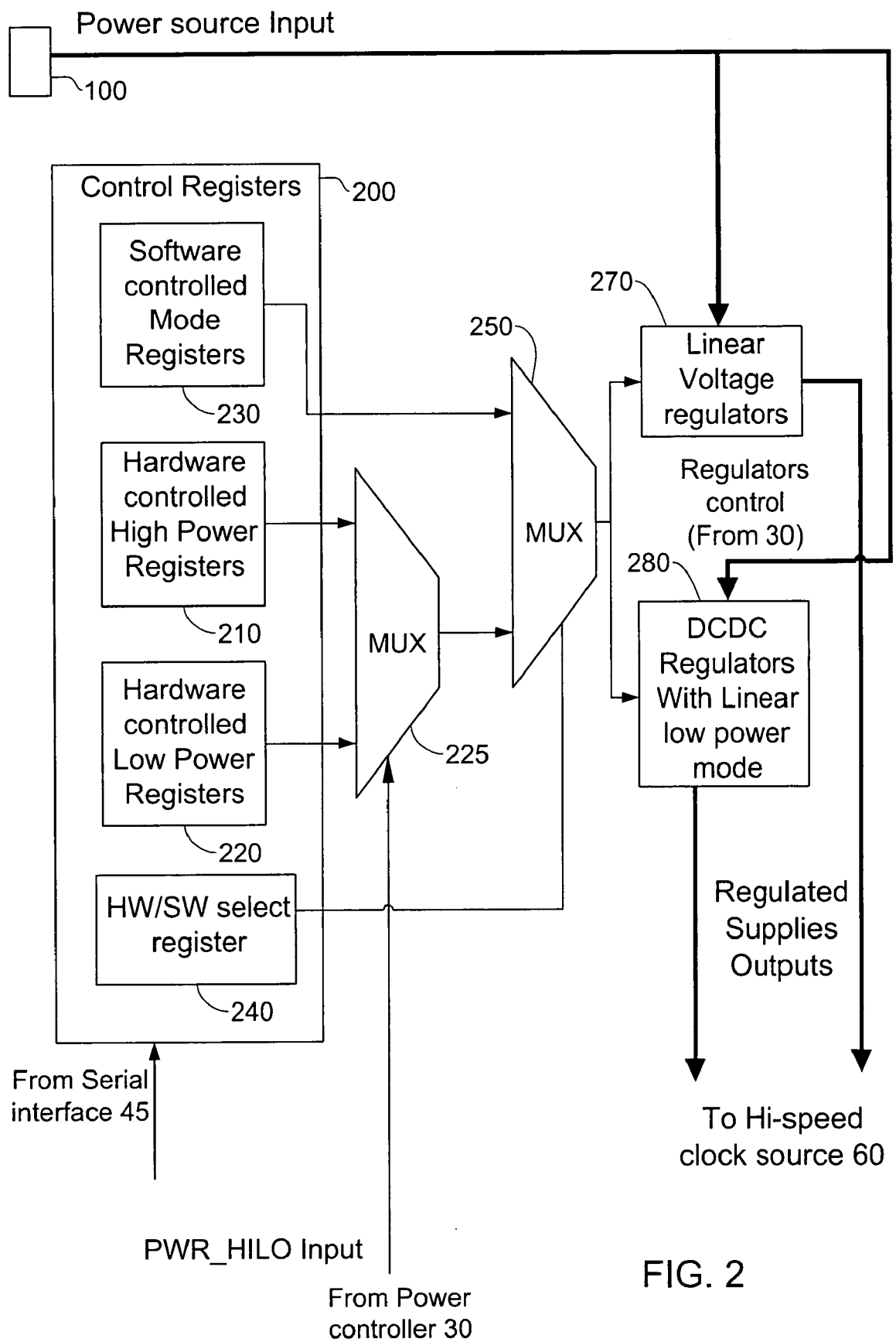
FIG. 2 is a simplified block diagram illustration of the PMU of FIGS. 1A-1B constructed and operative in accordance with a preferred embodiment of the present invention.

Reference is now made to FIG. 2 which is a simplified block diagram illustration of the PMU 40 of FIGS. 1A-1B constructed and operative in accordance with a preferred embodiment of the present invention. As shown, according to a preferred embodiment of the present invention, power management is SW configurable and HW/SW controllable e.g. via the PWR_HILO signal and HW/SW select register 240 in the illustrated embodiment. The SW, which may reside in CPU 10, configures a set of registers 200 by means of a serial interface 45 of FIGS. 1A and 1B which provides a "regulators control" input to the PMU 40. The registers define the output voltages levels, and operating mode of every voltage regulator per each of pre-configured system modes. In the illustrated example three operating modes are supported. When SW controlled mode is used, the multiplexer 250 passes the settings which the CPU 10 (FIGS. 1A-1B) has programmed into the software controlled mode registers 230. When the SW of CPU 10 programs the PMU 40 into HW controlled mode, the multiplexer 250 is set to pass the output of multiplexer 225. Multiplexer 225, in turn, selects between two sets of SW programmed registers 210 and 220 according to the real time PWR_HILO signal arriving from the power controller 30. As shown, the real-time information of the system activity mode is typically shared with the power management unit 40, typically governing regulators' operating mode and output voltages. This real-time information, typically integrated from the clock-switch logic and the power controller 30, further enhances power efficiency through an immediate switch from a high-power DCDC converter mode, which requires some switching current, into very low power linear regulators 280.

More generally, there is provided, in accordance with a preferred embodiment of the present invention, a power management system managing the supply of power to a hardware device, the system comprising at least one power source, at least one power supply regulator and a hardware setting selector. The power supply regulator is operative to control the supply of power from the power source to the hardware device in accordance with a selectable one of a plurality of regulator settings such as but not limited to one, some or all of the following regulator parameters: output voltage level, operating mode (on/off), and level of power consumption. The hardware setting selector is operative to select one of the plurality of regulator settings and may comprise a plurality of setting storage units each storing parameters of an individual one of the plurality of settings and a hardware selector operative to select one of the plurality of setting storage units.

Figure 3:
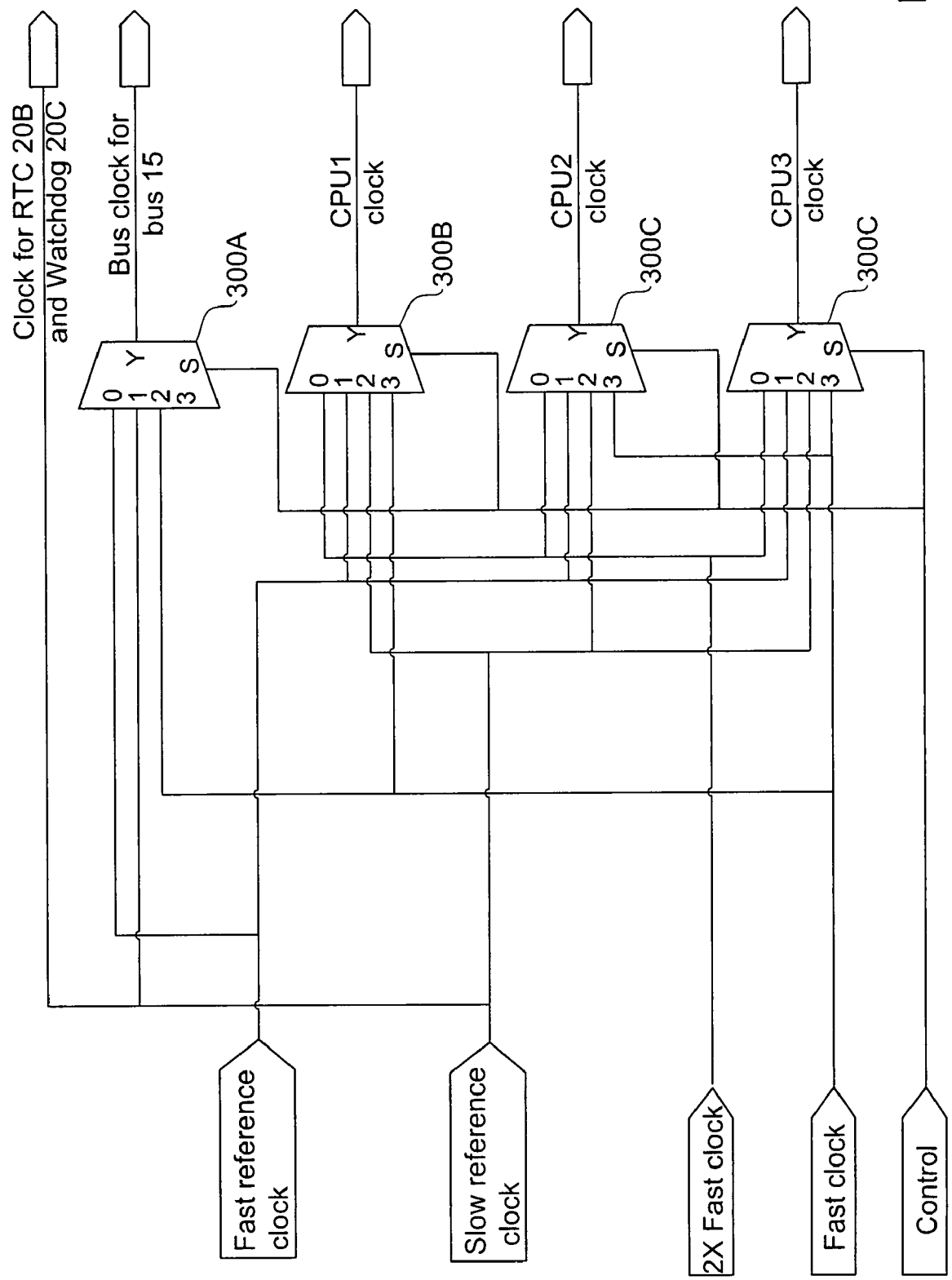
FIG. 3 is a simplified block diagram illustration of the CMU of FIGS. 1A-1B constructed and operative in accordance with a preferred embodiment of the present invention.

Reference is now made to FIG. 3 which is a simplified block diagram illustration of the CMU 50 of FIGS. 1A-1B constructed and operative in accordance with a preferred embodiment of the present invention. As shown, configurable clock multiplexers e.g. clock multiplexers 300A, 300B, 300C and 300D, are used to activate the CPU-BUS and CPUs 10. The selection of the clock source for each multiplexer typically is provided by the power controller 40.

Figure 4:
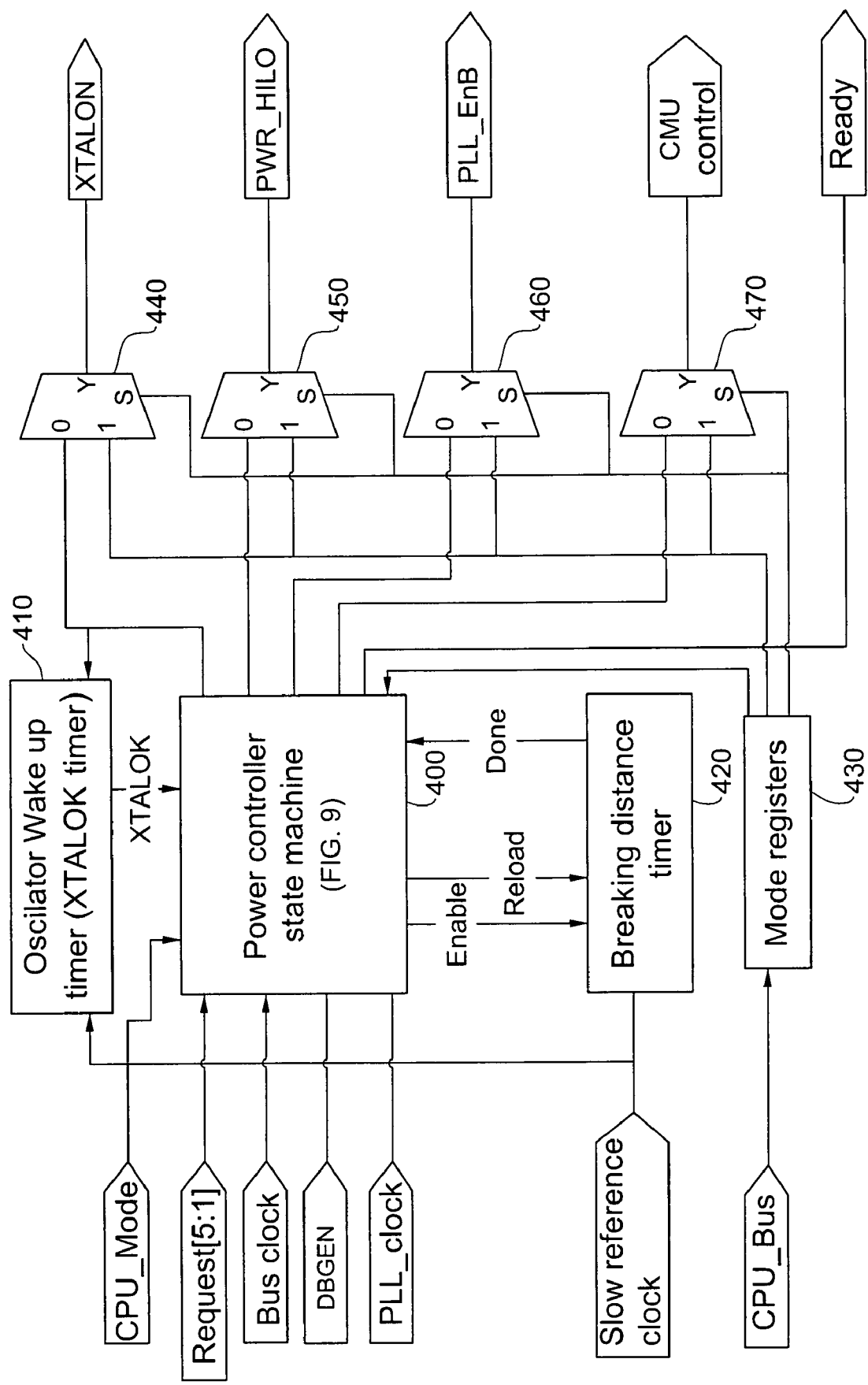
FIG. 4 is a simplified block diagram illustration of the power controller system of FIGS. 1A-1B constructed and operative in accordance with a preferred embodiment of the present invention.

Reference is now made to FIG. 4 which is a simplified block diagram illustration of the power controller system of FIGS. 1A-1B constructed and operative in accordance with a preferred embodiment of the present invention. The mode registers 430 define the various controlled signals such as but not limited to XTALON, PWR_HILO, PLL_EnB, as per the various tables and diagrams illustrated herein in FIGS. 5-11. For example, the selection of the clock source for each multiplexer may be generated by configurable mode registers 430 in conjunction with the HW state machine 400.

Figure 9:
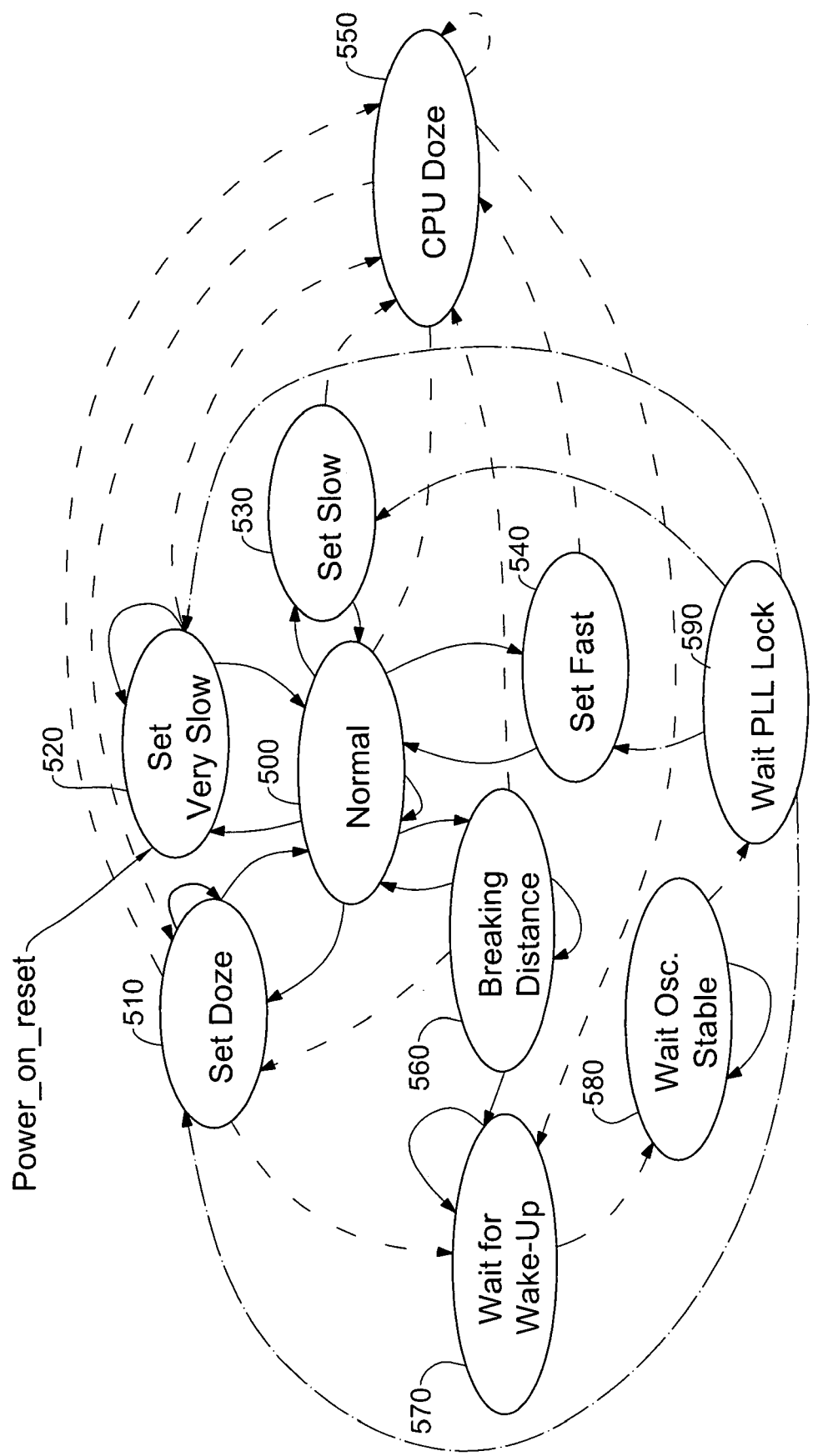
FIG. 9 is a simplified state chart for the power controller state machine of FIG. 4 constructed and operative in accordance with a preferred embodiment of the present invention.

The hardware state machine 400 of FIG. 4, as described in detail below with reference to FIG. 9, is typically controlled by a combination of software (to reflect demands of CPU 10) and hardware (to reflect on-chip and off-chip demands) in order to optimize the total power consumption through real-time control over the CMU 50 and over the reference clock source oscillator 80. The Power controller 30 also controls the PMU 40 through a real-time signal, indicating to the PMU 40 the power demands of the system, in order to further reduce the total power consumption. Preferably, an oscillator wake-up timer 410 allows a typically configurable period of time to elapse before involving the oscillator in a system wake-up from low-power mode.

Figure 5:
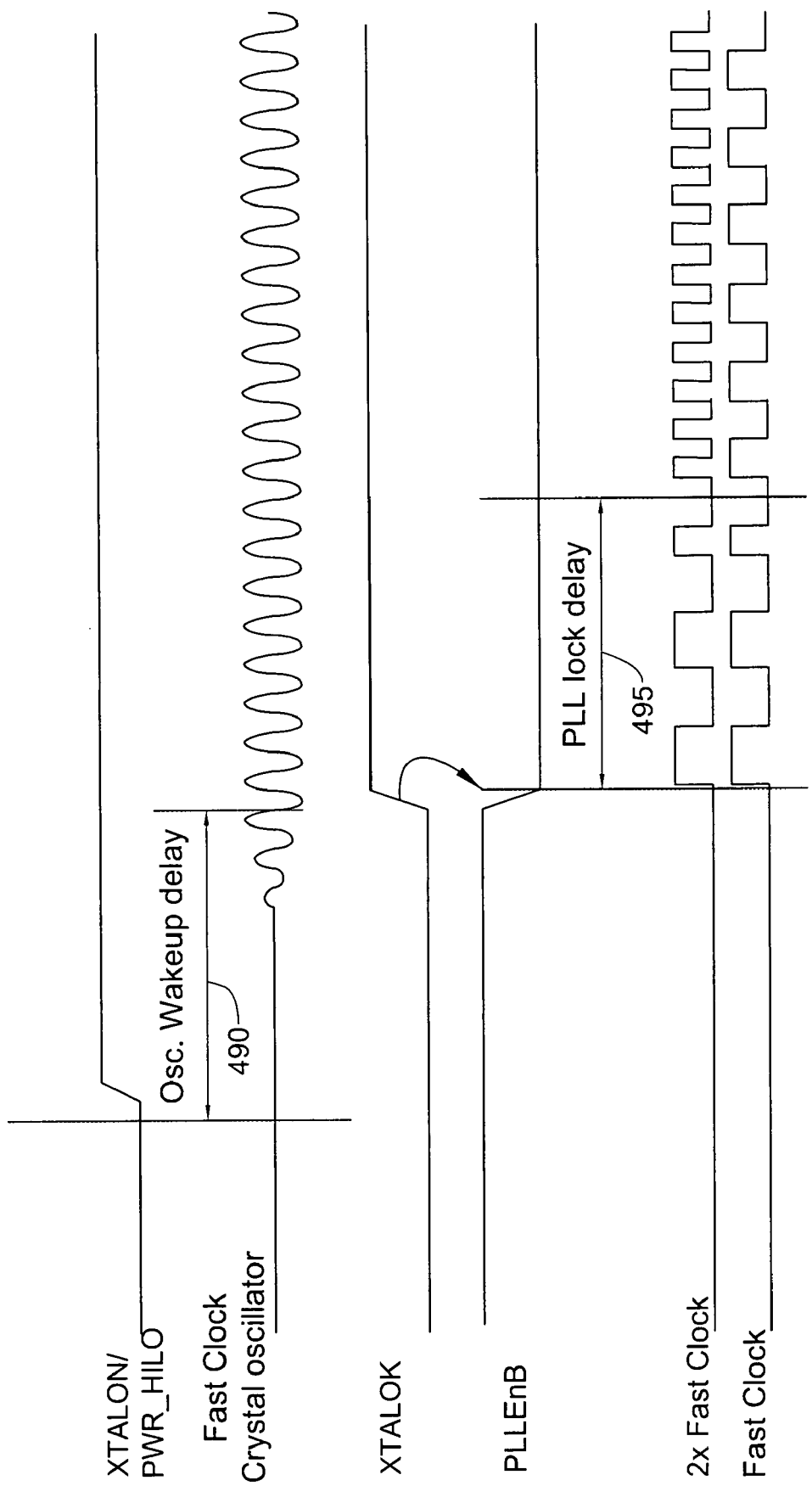
FIG. 5 is a timing diagram of a wake-up sequence for the system of FIGS. 1A-1B, provided in accordance with a preferred embodiment of the present invention.

FIG. 5 is a timing diagram of a wake-up sequence for the system of FIGS. 1A-1B, provided in accordance with a preferred embodiment of the present invention. The system of FIGS. 1A-1B is designed for a specific wireless real-time service such as a digital cordless phone, also termed herein "the main service". As such the service timing (depending on service traffic) is asynchronous to the CPU real-time SW demands.

When the system of FIGS. 1A-1B is active it is assumed that its Slow clock reference 90 is active even when the main Fast reference clock 60 is turned off. The slow clock is used to count the stabilization time of the Fast oscillator 70 and to assert signal XTALOK high as shown in FIG. 4. Once XTA- LOK is high, the PLL 55 is activated by driving PLLEnB Low and up to PLL Lock delay later the system clocks are ready as shown in FIG. 5.

The main PLL 55 of FIGS. 1A-1B is operative to provide Fast-Clock/2xFast-Clock system clocks for the digital core, including Modules 20A, 20B and 20C and CPU sub-systems 10). The Fast-Clock/2xFast-Clock system clocks may be used even when the Main service is not active. For this reason, the PLL control and the power control which may be controlled by SW residing in the CPU/s 10 (typically via mode registers 430) allow these clocks to be activated, and the PMU 40 to be in high power mode, even when the Main-Service is not active.

A preferred embodiment of the breaking distance timer: 420 of FIG. 4 is now described in detail. When a system is called upon to wake-up from low-power mode, there is both a delay penalty (for oscillator and PLL stabilization) and power penalty (power consumed by the system during the stabilization period). The breaking distance timer 420 prevents the system from going into low-power for a certain time interval ("breaking distance") thereby allowing the system to respond quickly to an incoming interrupt (or other high power requestor event) during that interval. This is typically done by preventing the fast reference clock 70 and PLL 55 of FIGS. 1A-1B (also termed herein the "clock tree"), from turning off within the "breaking distance" which is a programmable duration beginning as the system enters into low power consumption mode. The timer 420 is used to allow the system to respond quickly to interrupts that take place shortly after the CPU is placed into low power mode. The timer 420 is enabled by SW via the mode registers 430 by setting a control bit in the mode registers 430 and placing the CPU 10 into low power operating mode. If no interrupt request is asserted during the subsequent programmable number of clock cycles, the system clock is turned off. However, if an interrupt is asserted during that time, the breaking distance timer 40 is cleared and the system resumes normal operation immediately.

It is appreciated that, alternatively, more than one timer may be provided if it is desired to provide a go-to-sleep sequence with three or more tiers rather than two tiers. In the illustrated embodiments, low-latency units go to sleep without delay whereas high-latency units go to sleep with a certain delay ("breaking distance"). If more than one timer is provided, more than two levels of latency may be provided which respectively go to sleep after respective delays of increasing lengths.

The "breaking distance" duration in which the clock tree stays on despite the low power mode is typically programmable and is typically selected to fit the histogram of lengths of time which elapse between each turning-off event and the subsequent turning-on event.

Figure 6:
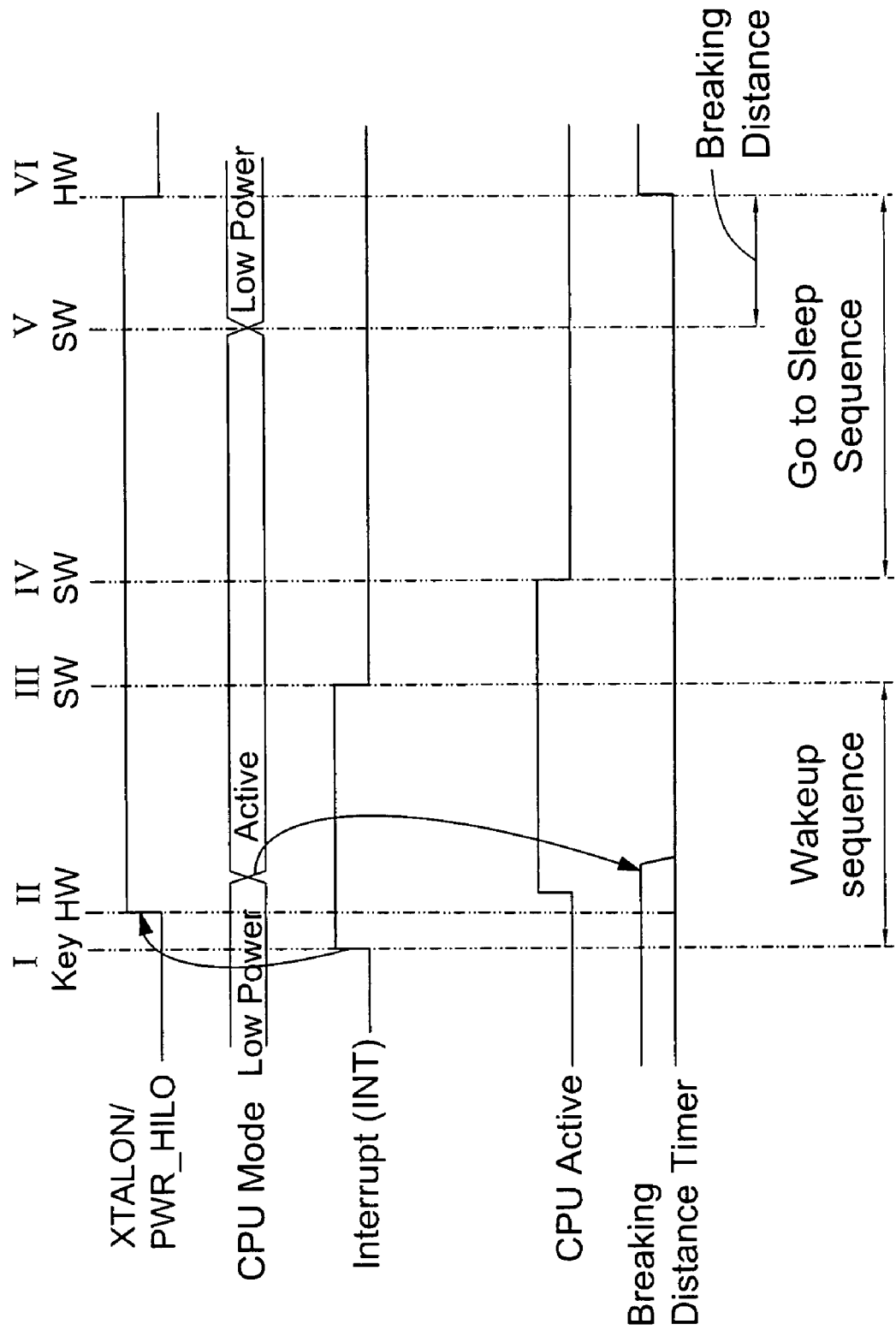
FIG. 6 is a timing diagram for the keypad controller module of FIGS. 1A-1B, provided in accordance with a preferred embodiment of the present invention in which arrows illustrates causal relationships, in that the base and head of the arrow represent cause and result respectively.

Reference is now made to FIG. 6 which illustrates a sequence of waking the system clock by pushing a key on keypad 25 and then restoring the system to low power mode. The timeline of FIG. 6 provides improved or optimized synchronization between the crystal oscillator power-up/down and regulators settling and operating mode control. In the illustrated embodiments, these functions are split between different devices.

Figure 12:
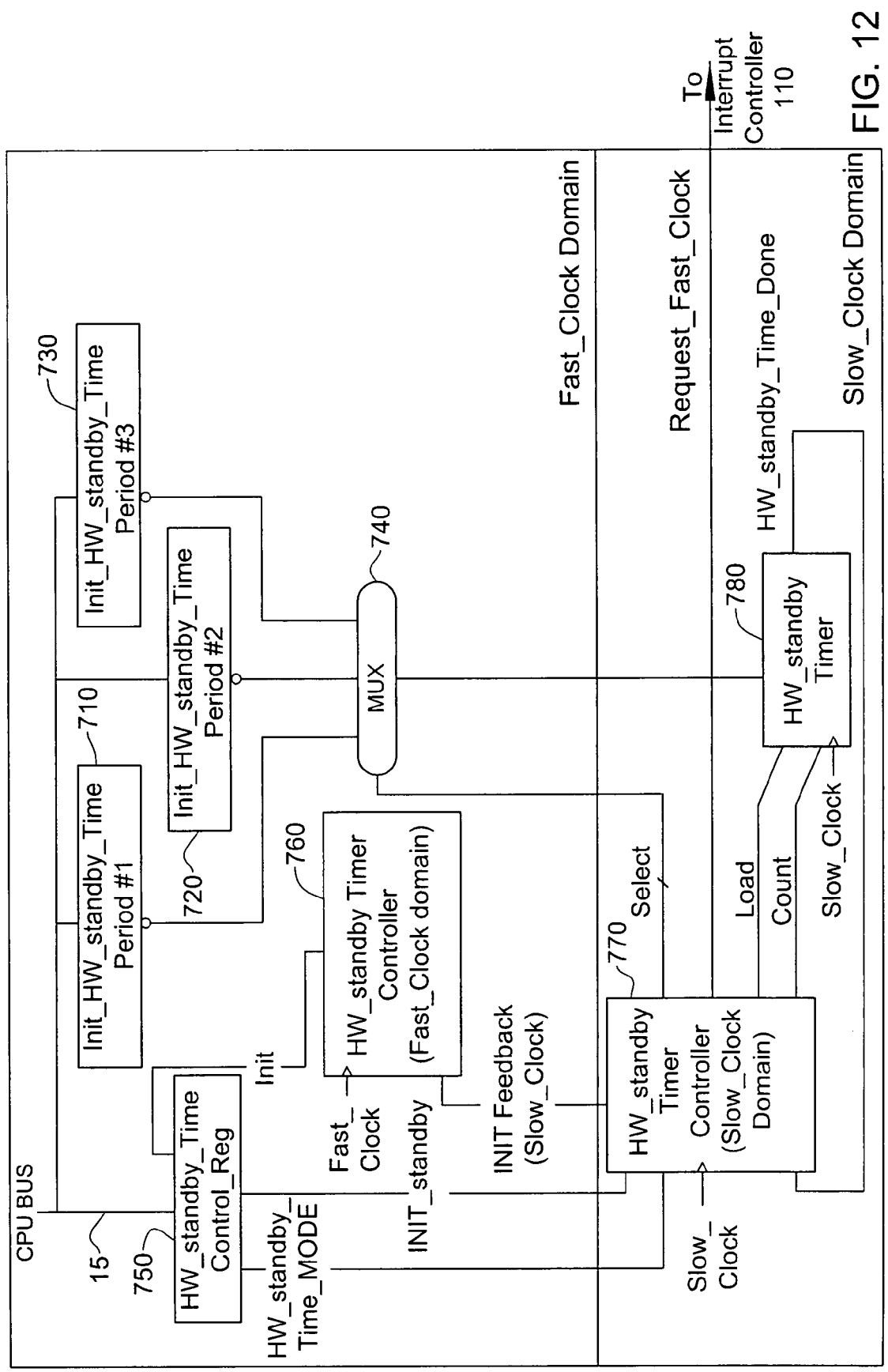
FIG. 12 is a simplified block diagram illustration of the system block module of FIG. 1B constructed and operative in accordance with a preferred embodiment of the present invention.

The following stages I-VI are illustrated in FIG. 12:

I. Key is pressed and an interrupt request is set

II. XTALON is set high, PWR_HILO goes to high power mode by HW, and an interrupt is asserted to the CPU 10

III. SW residing in CPU/s 10 services the keypad request and clears the interrupt request upon completion.

IV. The SW turns off "non-critical" clocks for all modules which are not allowed to wake-up the system and ends processing V. The SW enters into low power mode and waits for an interrupt request VI. N cycles later, if no interrupt request is asserted, XTALON goes low and turns the clocks off; and PWR_HILO goes low and places the PMU 40 into low power mode.

A particular feature of a preferred embodiment of the present invention is that the PWR_HILO and XTALON signals become active in wakeup sequence. Tightly coupled energy-management allows for zero overhead due to power management mode change. This enables the system to change the regulators' operating mode from low-power linear mode into high-power DCDC conversion mode while the system wakes-up and while the crystal oscillator stabilizes.

The CMU 50 may support some or all of the 6 different clock operating modes for the CPU subsystem 10 shown in FIG. 7. In each mode, the clock sources for the CPU 10, CPU bus 15 and module 20E are as shown.

After reset, the System is placed into Very Slow operating mode or DOZE. Once the start state is complete, the system enters one of the other modes according to system demands. As an example, when the system is to connect to a wireless service it activates the main service module 20E and goes into Slow mode. Once the service has been acquired and no further processing is required, the system may go into Doze or Stop state. When a service is active the system may be in Slow mode or Fast mode according to the amount of CPU processing power required: When high processing power is required (e.g. in Voice processing applications) the system may be in Fast mode. When low processing power is sufficient (e.g. for display update or response to a key press) the system is usually in Slow mode. When there is no need for CPU processing but the main service module is supposed to be active (as in a case of link activity with no SW demand) the CPU 10 is not required and the system can be in CPU-Doze mode.

In addition, 3 conventional operating modes for the System clocks are shown in prior art FIG. 8. Off, Idle and Active are the different states of the main service Module 20E as a function of the service. When a cordless phone, for example, is not active then the main service block 20E need not be active. When the phone is in "standby" i.e. no call is active, module 20E is in Idle state. When a call is active module 20E may be in its active state.

Reference is now made to FIG. 9 which illustrates a preferred embodiment of the clock control state machine 400. The state machine 400 typically manages the clock source 60, clock multiplexers 440-470, and XTALON signal. The normal operational state is "Normal" state 500 and when a configuration change is required, the state machine goes into a corresponding configuration change state (one of the following states shown in FIG. 9: Set Doze state 510, Set Very-Slow state 520, Set Slow state 530, Set Fast state 540, and Set Doze state 550). When the system enters into low power, state machine 40 first enters into Breaking-Distance state 560 during which the PLL 55 and clock oscillator 70 of FIGS. 1A-1B are both active. If during the "break distance" delay time, no interrupt was requested, the system turns the clock oscillator 70 off, and will operate from the Slow clock source 90. The state-machine 400 will park at the "Wait For Wake-Up" state 570. The wake-up sequence from low-power is typically effected in several stages. The first stage activates the oscillator 70 and waits for it to stabilize (Wait Osc. Stable state 580). Once the oscillator is stable, the system waits for the PLL 55 to lock (Wait PLL Lock state 590). Once all the clocks are active, the system reverts to the same operating mode as it was in before the low power mode was entered.

Preferred hardware wakeup control is now described, for hand-held applications when the system of FIGS. 1A-1B is used as the master processor. In such applications, when the CPU 10 is placed in low-power operating mode, the user may press a key on the keypad 25 which activates the CPU 10 to respond to the key-press. A preferred mechanism to activate the CPU clocks and to wake-up the CPU 10 is illustrated in FIG. 6. When the CPU 10 is set to low power mode, it enables all required hardware sources such as the interrupt controller 110 and Keypad controller 20A of FIG. 1A. The keypad controller 20A remains active using the slow reference clock source 90, while the CPU is in low-power mode. The interrupt request from the keypad controller 20A is used to re-activate the CPU clocks WHICH. As a result, XTALON and PWR_HILO are driven high (active), the CPU and BUS clocks are invoked and the PMU 40 enters into high-power mode. When the main CPU 10 is active, an Interrupt signal is sent through the interrupt controller 110 to the CPU 10 to indicate the event. Once XTALON is set to active, the Interrupt can be cleared only by the CPU 10 thus avoiding a potential race condition.

Wakeup control for the RTC module 20B of FIG. 1A may for example be as follows: The RTC is active, continuing its counting, even when the CPU1 Clock is turned off. If the RTC alarm time is reached, this event drives XTALON active to allow the alarm event to be serviced by the CPU 10.

Wakeup control for the watchdog module 20C of FIG. 1A may for example be as follows: The watchdog is active, continuing its counting from the slow reference clock, even when the CPU1 Clock is turned off. If the watchdog timeout is reached, an interrupt request is sent to the power controller 30 and to the interrupt controller 110. This event drives XTALON active to allow the watchdog event to be serviced by the CPU 10.

Referring again to FIG. 1B, optionally, the clocks may be activated by a host processor. When a host processor is used as a master device, it typically interfaces with the systems of FIG. 1A or 1B through a Host Interface Module 20D, shown in FIG. 1B. Clocks may sometimes need to be active in order to allow data transfers regardless of the System real-time activity scheduling. In such a case the Host Interface module 20D asserts a clock request (Request 7 in FIG. 1B) signal to activate the system clocks to allow the host interface module 20D to pass data to/from the CPU module/s 10 from/to the host interface module itself. When the clocks are active, the Power Controller 30 indicates to the host interface module 20D that the clocks are ready (Ready signal in FIG. 1B). The CMU 50 uses the specific clock request signal that matches the selected host interface module 20D (Request 7). When no host processor is in use, this functionality is disabled. When the host processor activates the system clock it does not affect the CPU status, and as such the host may turn on and off the clocks if no other event requires the clocks to be active.

Optionally, system clocks may also be activated by System HW module 20E of FIG. 1B. The System Module 20E has a scheduling timer, also termed herein the "HW standby timer", which is used to schedule the CPU bus clocks' activation according to a pre-programmed application-specific service time of the Main Service which in the embodiment particularly shown and described herein comprises a digital cordless link. When this timer event is set, it activates the clocks of the CPU bus 15 as well as the CPU1 clocks. Once this event is set, it can be cleared only by SW e.g. by writing to the HW_standby_Time Control_Reg 750 (FIG. 12). Therefore, once Module 20E requires the CPU response, Module 20E issues an interrupt request to the CPU 10 which puts the system out of low power mode. A preferred embodiment of the system hardware module 20E and its standby timer is described in detail below with reference to FIGS. 12 and 13A-13B.

According to a preferred embodiment of the present invention, a debugging support pin, also termed herein "the DBGEN pin" 115, may be provided in the system of FIGS. 1A-1B as shown. The pin is provided because the main CPU core 10 of FIGS. 1A-1B typically requires the CPU clock to be active for the debugging logic to function (using a serial interface such as a JTAG protocol). When this pin is driven low, it ensures that the main CPU clocks are active regardless of the operating mode that the system is in. However, in order to allow debugging of the actual sequences that may occur when the debug logic is not in use, the pin 115 typically only activates the clock tree, without affecting any of the low power control signals in the CMU 50.

Preferably, a pin, termed herein "the PWR_HILO pin", is used to allow power controller 30 to provide a power management real time control signal to PMU 40 as shown in FIGS. 1A-1B, 2 and 4. The PWR_HILO pin is used to define to the external power management, a required operating mode according to the following description. The signal is controlled by hardware and software as shown in the PWR_HILO pin values table of FIG. 10. The PWR_HILO pin operating mode may for example be defined according to the last column in the table of FIG. 7.

The system of FIGS. 1A-1B has clock domains based on two original clock sources, the Fast reference Clock and the Slow reference Clock. The Slow Clock typically comprises a low frequency reference clock (such as a 32 KHz) which is always active. It is used to drive the CPU and CPU bus clocks 300A-300D of FIG. 3, the Real Time Clock 20B of FIG. 1A, the System block Module 20E in FIG. 1B, the scheduling timer 780, and the WATCHDOG timers 20C. The Slow Clock is active even when all other clocks in the HW Device 120 of FIGS. 1A-1B are turned off. The slow clock is also used to activate the keypad controller module 20A in FIG. 1A when the main CPU 10 is in low-power mode, to allow module 20A to sense a keypad key-press.

The Fast Clock is the System Master Clock and is used by the fast hardware blocks 10, 50, 20D and 20E and CPU subsystems 10 during normal operation. The Fast Clock is preferably turned off to reduce power dissipation when it is not needed.

Figure 11:
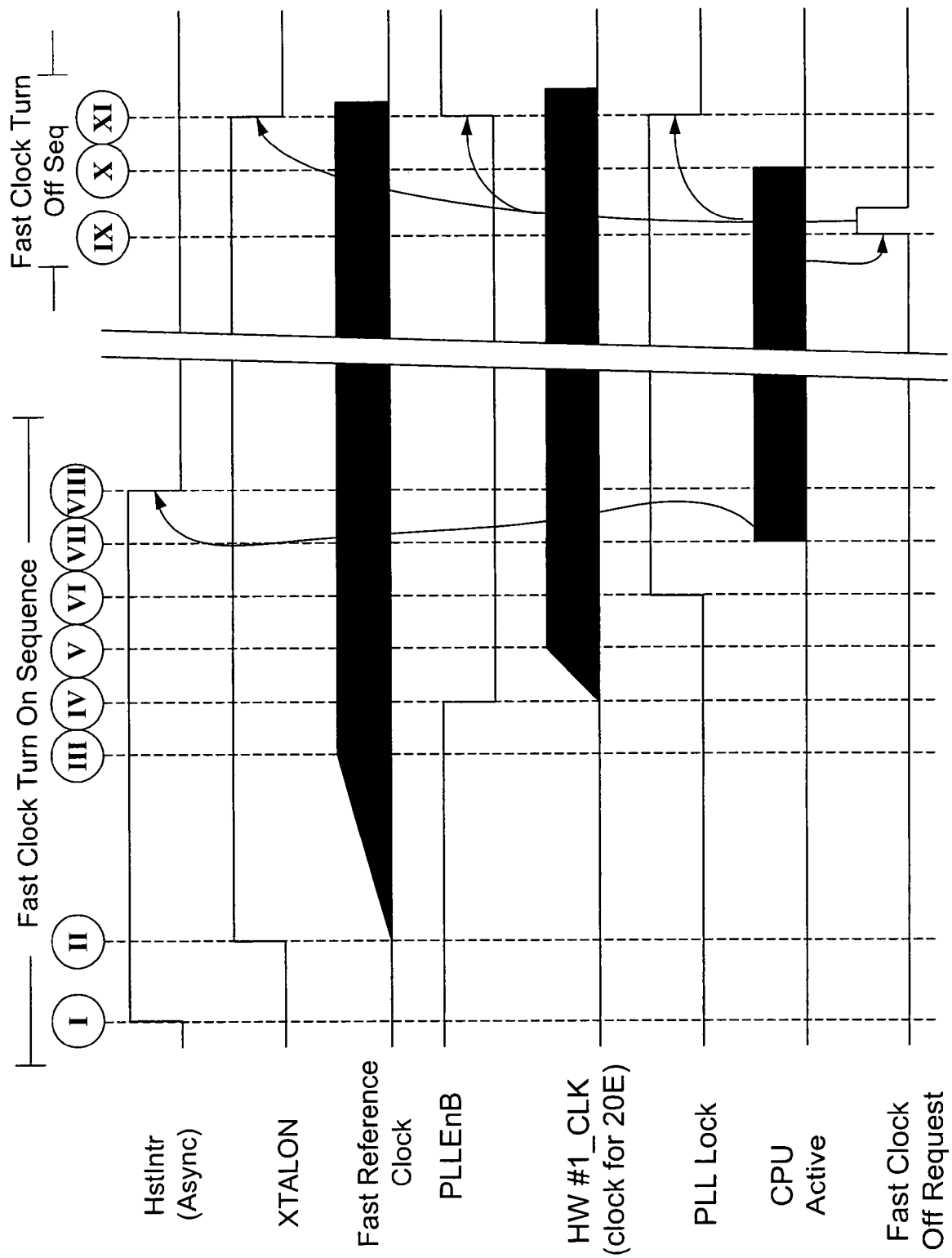
FIG. 11 is a turn on/off sequence for the fast clock of FIGS. 1A-1B, provided in accordance with a preferred embodiment of the present invention.

The System Fast Clock turn-on/turn-off sequence of FIG. 11 is suitable for a main CPU Subsystem 10 having a low power state characterized in that:

(a) The main CPU is halted with the Fast Clock gated off at the main CPU. The Fast Clock can be active while the main CPU is in this low power state.

(b) The main CPU enters into this Low Power state via execution of some instruction. Execution of such a Low Power instruction keeps the system clock active, while halting the internal CPU clock tree.

(c) The main CPU can be transitioned into an ACTIVE state at a known Program Counter location by assertion of at least one control signal(s), arriving over INT, an interrupt request line. The main CPU is deemed "Active" when it is executing instructions.

Reference is now made to FIG. 11 which describes a preferred Turn On/Off Sequence for CPU1 Clk, the fast clock of the main CPU 10 of FIGS. 1A-1B. PLL_Lock is an indication provided by the PLL 55 for its lock condition, which is used by the state-machine 400. The CPU Active graph illustrates periods of activity of the CPU, as per the CPU clock. Fast_Clock_Off request may comprise the Mode signal provided by CPU 10 to the Power controller 30 and typically used by the Power Controller state machine 400. A High on this signal indicates the CPU 10 is in "wait for interrupt" status. A Low on this signal indicates that the CPU 10 is running.

Figure 13A:
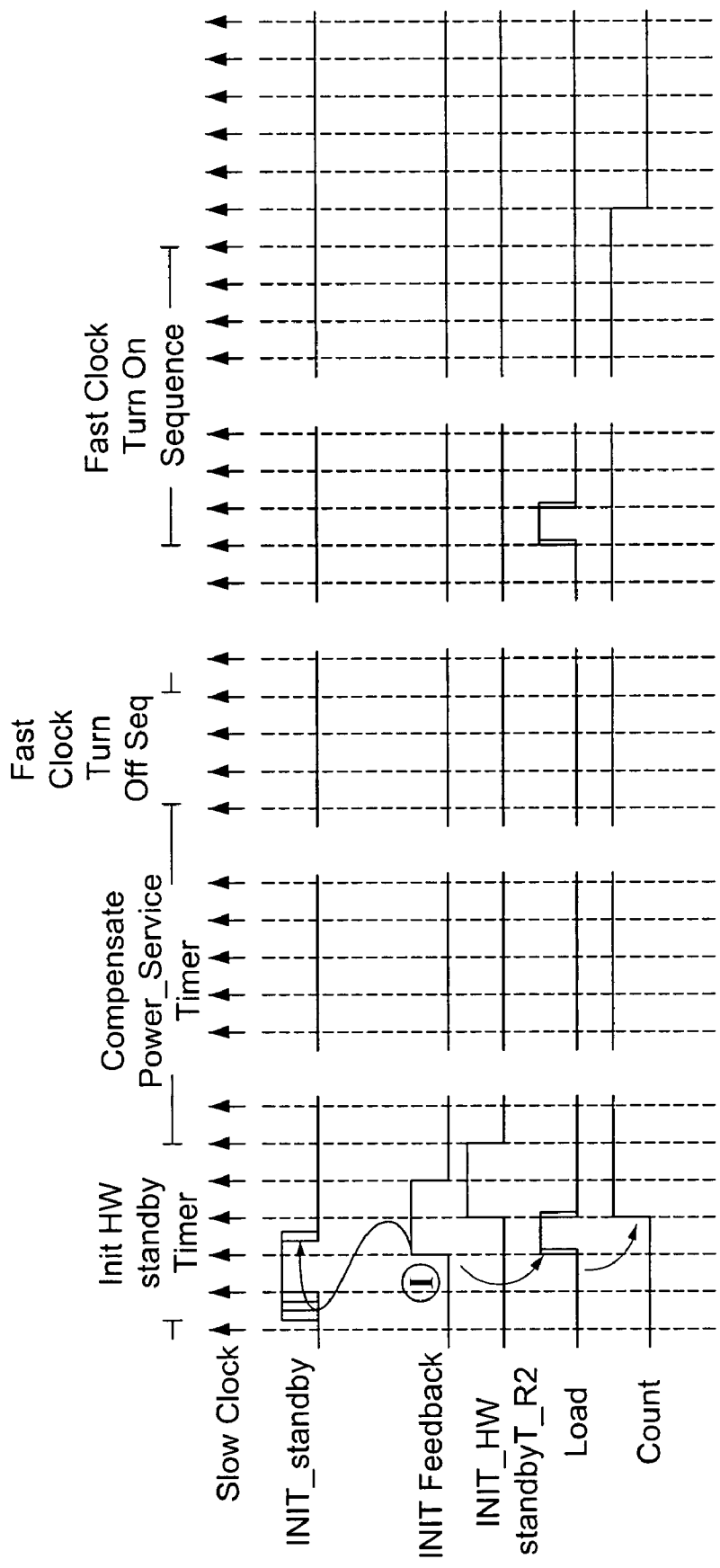
FIGS. 13A-13B, taken together, form a diagram depicting activation of the clocks of the system block module of FIG. 12 in accordance with a preferred embodiment of the present invention.
Figure 13B:
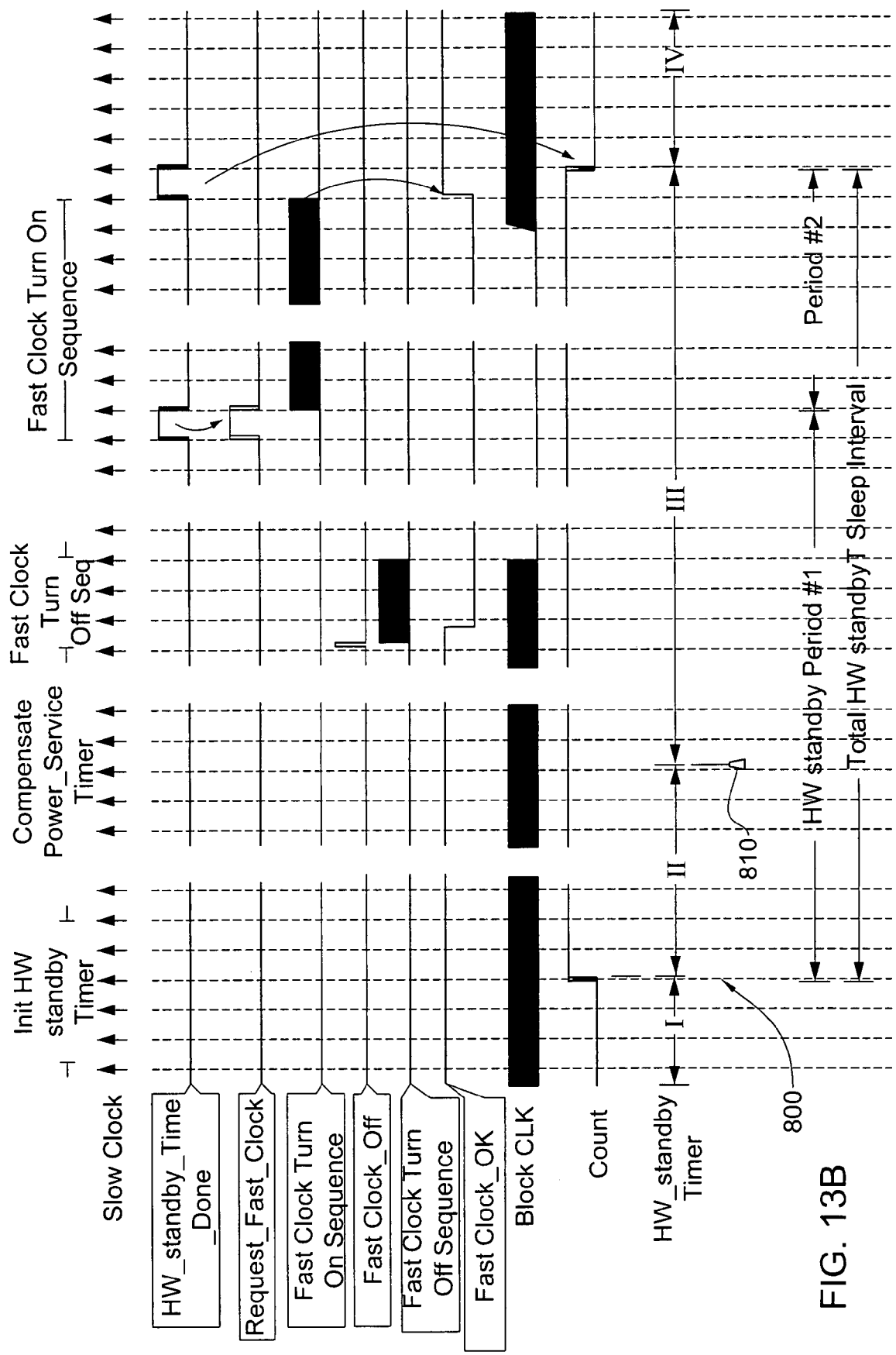

FIG. 12 is a simplified block diagram illustration of the system block module 20E of FIG. 1B constructed and operative in accordance with a preferred embodiment of the present invention. FIGS. 13A-13B, taken together, form a diagram depicting activation of the clocks of the system block module 20E of FIG. 12 in accordance with a preferred embodiment of the present invention. Reference numeral 800 in FIG. 13B marks a time-point at which the CPU 10 loads the power service timer 780 of FIG. 12 with a HW standby timer sleep period value.

As shown in FIGS. 12 and 13A, an Init_standby signal goes from HW standby_Time register 750 to HW_standby_Timer Controller 770 to start a standby period count. An Init signal which goes from timer controller 760 to register 750 requests the start of standby time, to signal to the HW_Standby_Time register 750 that the standby period count process has started. An Init feedback signal provided by unit 770 to unit 760 assures proper synchronization of the Init request to the slow clock domain. A Load signal loads the standby period value into the standby timer 780. A Count signal enables the standby timer 780 to count, starting immediately after the standby period value has been loaded to the HW_standby_Timer 780.

As shown in FIGS. 12 and 13B, the HW_Standby_Time_Done_signal is an output from the standby timer 780 which indicates when the standby period has elapsed. A Request_Fast_Clock signal goes from the HW_Standby_Timer_Controller 770 to the interrupt controller 110. The Fast_clock_turn_on_sequence signal is the fast clock of module 20E. The Fast_Clock_Off signal is the CPU mode signal going from CPU 10 into the state machine 400 of power controller 30. The Fast_clock_turn_off sequence is a timeline illustration of the state machine 400 going from its Normal state 500 into its Wait for Wake-Up state 570, corresponding to the counting period of the breaking distance timer 420. Fast_Clock_OK is the PLL LOCK provided by PLL 55 to the Power controller state machine 400. The Block_clock signal is the block fast clock coming from the CMU 50. The Count signal is the standby timer 780's count enable signal coming from HW standby Timer controller 770.

The wakeup period typically requires activation of reference clock source 70 and re-activation of PLL 55. So, once the standby period #1 is programmed in the Period #1 register 710, the HW_standby_Timer may be automatically re-loaded with a compensation value from Period #2 register 720 representing the duration of the wakeup period, in order to time the activation of the main service module 20E such that it starts its operation once the fast clock is ready. This mechanism allows for timing of re-activation of clocks to proceed in accordance with Period_#1_register 710 and actual activation of the main service module 20E at Standby Period T=Period T1+Period T2.

The HW_standby_Timer graph is a timeline for the HW_standby_timer 780. As shown, during first and fourth periods I and IV, also termed herein the "Power_Service+=1" time periods, the timer increments every clock cycle. During a second "power_servicehold" period II, the timer value does not change. During a third "power_servicecomp" period III, the timer value is the above-described wakeup compensation value.

Reference numeral 810 marks a time-point at which the HW reloads the HW_standby Timer 780 with the wakeup duration time as stored in the Period #2 register 720.

Optionally, additional time registers such as a Period_#3_register 730 are added to allow for gradual activation of the system of FIGS. 1A-1B so as to generate multiple wakeup events. This may be done such that the module 20E starts its activity after a standby duration comprising multiple incremental wake-up stages at a programmable delay from each other, wherein the sum of all duration registers (e.g. 710, 720, 730) equals the standby duration for the main service module 20E.

Features of the present invention which are described in the context of separate embodiments may also be provided in combination in a single embodiment. Conversely, features of the invention which are described for brevity in the context of a single embodiment may be provided separately or in any suitable subcombination.

The invention claimed is:

1. A system for activating and deactivating a hardware device and comprising:
   a first stage electronic deactivation unit operative, responsive to a deactivation request, to perform a first deactivation operation comprising deactivation of a first portion of the hardware device having low wake-up latency at a first time t1; and
   a second stage electronic deactivation unit including a breaking distance timer activated subsequently to said deactivation request thereby to time a breaking distance t2-t1, the second stage electronic deactivation unit being operative to deactivate a second portion of the hardware device having high wake-up latency at a subsequent second time separated from said first time t1 by said breaking distance t2-t1,
   wherein said first stage electronic deactivation unit is operative, responsive to a wake-up event, to reactivate the first portion of the hardware device, and wherein said second stage electronic deactivation unit is operative, responsive to the wake-up event, to deactivate the breaking distance timer.

2. A system according to claim 1 wherein the hardware device has at least one power source and wherein said system also comprises a hardware PMU (power management unit) which regulates the power source.

3. A system according to claim 1 wherein said breaking distance is programmable.

4. A system according to claim 1 and also comprising a power management system managing the supply of power to the hardware device, the power management system comprising:
   at least one power source;
   at least one power supply regulator operative to control the supply of power from the power source to the hardware device in accordance with a selectable one of a plurality of regulator settings; and
   a hardware setting selector operative to select one of the plurality of regulator settings.

5. A system according to claim 4 wherein said hardware device comprises hardware components including a clock source and a PMU (power management unit) and wherein said system also comprises a hardware power manager operative to receive an indication of said breaking distance, to receive an indication of the operating states of at least some of the hardware components of the hardware device and to determine accordingly, in hardware, activation/deactivation of at least one of the hardware device's clock source and PMU.

6. A system according to claim 5 wherein said hardware power manager provides real time control of the clock source according to the states of said plurality of hardware components such that the clock source is off if and only if all operating states of all of said hardware components allow said clock to be off.

7. A system according to claim 5 wherein said hardware power manager comprises request monitoring hardware operative to monitor requests directed to a CPU in the hardware device by any of a plurality of sources.

8. A system according to claim 5 wherein said hardware power manager is operative to selectively disable the hardware device.

9. A system according to claim 4 wherein at least a portion of said system and at least a portion of the hardware device reside on a single semiconductor device.

10. A system according to claim 1 and also comprising a functionality residing in a CPU in the hardware device which is operative to selectably disable activation of the breaking distance timer.

11. A system according to claim 1 wherein said functionality is operative to selectably disable the hardware device's capacity to gate off clocks, thereby to provide activity of the hardware device's clock source and PMU at any selectable time.

12. A method for activating and deactivating a hardware device comprising:
performing, responsive to a deactivation request, a first deactivation operation comprising deactivation of a first portion of the hardware device having low wake-up latency at a first time t1;
activating a breaking distance timer subsequently to said deactivation request thereby to time a breaking distance t2-t1 and deactivating a second portion of the hardware device having high wake-up latency at a subsequent second time t2 separated from said first time t1 by said breaking distance t2-t1; and
responsive to a wake-up event, reactivating the first portion of the hardware device and deactivating the breaking distance timer.

13. A method according to claim 12 wherein said second portion of the hardware device comprises at least one clock source.

14. A method according to claim 13 wherein said second portion of the hardware device comprises all non-standby clock sources in the hardware device.

15. A method according to claim 12 wherein said hardware device comprises hardware components including a clock source and a PMU (power management unit) and wherein said method comprises providing a hardware power manager operative to receive an indication of said breaking distance, to receive an indication of the operating state of at least some of the hardware components of the hardware device and to determine accordingly, in hardware, activation/deactivation of at least one of the hardware device's clock source and PMU.

16. A system according to claim 15 wherein said indication of the operating state of at least some hardware components comprises an indication of the operating state of each hardware component in a programmable subset of the hardware components in the hardware device.

17. A system according to claim 15 wherein said indication of the operating state of at least some hardware components comprises an indication of the operating state of a group of more than one hardware component of a fixed subset of hardware components in the hardware device comprising more than one hardware component.

18. A method according to claim 12 wherein said hardware device comprises a semi-conductor device including at least one semi-conductor.

19. A method according to claim 12 wherein said first portion of the hardware device consumes most of the power consumed by the hardware device as a whole.

* * * * *